(12) United States Patent
Nakagawa et al.

(10) Patent No.: US 11,105,615 B2
(45) Date of Patent: Aug. 31, 2021

(54) DEFORMATION PROCESSING SUPPORT SYSTEM AND DEFORMATION PROCESSING SUPPORT METHOD

(71) Applicant: KAWASAKI JUKOGYO KABUSHIKI KAISHA, Kobe (JP)

(72) Inventors: Atsuki Nakagawa, Kakogawa (JP); Katsutoshi Higuma, Kakogawa (JP); Naohiro Nakamura, Kobe (JP); Kenta Morinaga, Marugame (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 229 days.

(21) Appl. No.: 16/066,342

(22) PCT Filed: Dec. 6, 2016

(86) PCT No.: PCT/JP2016/086207
§ 371 (c)(1),
(2) Date: Jun. 27, 2018

(87) PCT Pub. No.: WO2017/115620
PCT Pub. Date: Jul. 6, 2017

(65) Prior Publication Data
US 2019/0017815 A1 Jan. 17, 2019

(30) Foreign Application Priority Data
Dec. 28, 2015 (JP) .............................. JP2015-256194

(51) Int. Cl.
*G01B 11/25* (2006.01)
*G01B 11/24* (2006.01)
(Continued)

(52) U.S. Cl.
CPC .......... *G01B 11/2513* (2013.01); *G01B 11/24* (2013.01); *G06F 30/00* (2020.01);
(Continued)

(58) Field of Classification Search
CPC ..... G01B 11/2513; G01B 11/24; G06F 30/17; G06F 30/00; G06F 2119/18;
(Continued)

(56) References Cited

U.S. PATENT DOCUMENTS

| 5,991,703 A | 11/1999 | Kase |
| 2014/0015886 A1* | 1/2014 | Ooike ...................... B41J 3/407 347/14 |

(Continued)

FOREIGN PATENT DOCUMENTS

| JP | H06-147830 A | 5/1994 |
| JP | H11-65628 A | 3/1999 |
| JP | 2004-74200 A | 3/2004 |

OTHER PUBLICATIONS

Feb. 28, 2017 International Search Report issued in International Patent Application No. PCT/JP2016/086207.

*Primary Examiner* — James J Lee
*Assistant Examiner* — Shon G Foley
(74) *Attorney, Agent, or Firm* — Oliff PLC

(57) ABSTRACT

A deformation processing system acquires target shape data of a work including a reference line, acquires intermediate shape data from the work having an intermediate shape having a reference line drawn thereon, puts these two pieces of data side by side by positioning the reference lines relative to each other, and calculates a necessary deformation amount of the work based on the difference between the two pieces of data put side by side.

12 Claims, 11 Drawing Sheets

(51) Int. Cl.
*G06F 30/00* (2020.01)
*G06F 30/17* (2020.01)
*G06T 7/564* (2017.01)
*G06T 7/521* (2017.01)
*G06T 11/20* (2006.01)
*G05B 19/408* (2006.01)
*B21D 22/18* (2006.01)
*B21D 22/00* (2006.01)
*G06F 113/24* (2020.01)
*G06F 119/18* (2020.01)

(52) U.S. Cl.
CPC .............. *G06F 30/17* (2020.01); *G06T 7/521* (2017.01); *G06T 7/564* (2017.01); *G06T 11/203* (2013.01); *B21D 22/00* (2013.01); *B21D 22/18* (2013.01); *G05B 19/408* (2013.01); *G06F 2113/24* (2020.01); *G06F 2119/18* (2020.01); *G06T 2207/30164* (2013.01)

(58) Field of Classification Search
CPC .... G06F 2113/24; G06T 11/203; G06T 7/521; G06T 7/564; G06T 2207/30164; B21D 22/00; B21D 22/18; G05B 19/408; G05B 19/401; G05B 19/4083; G05B 2219/45229; G05B 2219/36203
See application file for complete search history.

(56) References Cited

U.S. PATENT DOCUMENTS

| | | | |
|---|---|---|---|
| 2015/0205892 A1* | 7/2015 | Kano | B21D 22/00 703/2 |
| 2017/0001371 A1* | 1/2017 | Sobue | B29C 64/147 |
| 2017/0060000 A1* | 3/2017 | Sumiyoshi | G03F 7/70783 |

* cited by examiner

TARGET SHAPE DATA

THREE-DIMENSIONAL MEASUREMENT DATA

SHOT IMAGE

TARGET SHAPE DATA AND
INTERMEDIATE SHAPE DATA OVERLAPPING WITH EACH OTHER

INTERMEDIATE SHAPE DATA

TARGET SHAPE DATA

CONTOUR FIGURE

DEFORMATION PROCESSING SUPPORT SYSTEM AND DEFORMATION PROCESSING SUPPORT METHOD

TECHNICAL FIELD

The present invention relates to a deformation processing support system and a deformation processing support method, that support deformation processing of a work.

BACKGROUND ART

When a large work is deformation-processed, plural bending processing sessions are traditionally conducted for the work by using, for example, a pressing machine. The overall work is deformation-processed into a target shape by conducting the bending processing for each of plural positions of the work.

For the work acquired after the deformation processing comes to an end, whether the work is finished into the target shape is checked by stacking a wooden form having a shape that corresponds to the target shape on the work. Because the work is large, the wooden form is divided into plural pieces.

Otherwise, for the work acquired after the deformation processing comes to an end, the shape thereof is checked using a three-dimensional measuring machine. For example, the shape of each of plural portions of the work is three-dimensionally measured by a 3D laser scanner. Plural pieces of partial shape data acquired by the measurement are combined with each other into one piece of data to produce overall shape data of the work as described in, for example, Patent Document 1. Based on the produced overall shape data of the work, it is checked whether the work acquired after the deformation processing comes to an end is finished into the target shape.

PRIOR ART DOCUMENT

Patent Document

Patent Document 1: Japanese Laid-Open Patent Publication No. 11-65628

SUMMARY OF THE INVENTION

Problems to be Solved by the Invention

During deformation processing of a work (for example, between a certain bending processing session and the succeeding bending processing session), a deformation amount of the work necessary for deforming from the intermediate shape to the target shape (a necessary deformation amount) such as, for example, the necessary deformation amount for each of plural positions of the work may be ascertained. In this case, the necessary deformation amount necessary for deforming to the target shape can be learned by stacking the wooden form on the work that has the intermediate shape, and ascertaining gaps between the wooden form and the work. To conduct this, however, much labor and a long time period are necessary because wooden forms corresponding to the plural positions of the work need to be stacked. When the shape of the work is complicated and large, much labor and a long time period are especially necessary because the number of the wooden forms is great. A gap between a surface peripheral edge portion of the wooden form abutting the work and the work can be visually observed while a gap between a surface central portion of the wooden form and the work may be unable to be visually observed.

On the other hand, the necessary deformation amount for each of the plural positions of the work necessary for deforming to the target shape can be calculated by overlapping intermediate shape data of the work during the deformation processing acquired by the three-dimensional measuring machine and target shape data of the work with each other and thereby calculating the difference between these two pieces of data.

A "best-fit" technique is present as an approach for overlapping the two pieces of shape data with each other. The "best-fit" is an approach according to which plural similarity points on the two pieces of data (feature points) are detected, the two pieces of data are positioned relative to each other using the similarity points as references, and the two pieces of data are thereby overlapped with each other. For example, the similarity point is a hole formed in the work, a corner portion of the work, or a marker attached to the work.

The overlapping precision of the two pieces of data by the "best-fit" may be degraded or the overlapping itself may be unable when the curvature significantly differs between the intermediate shape data and the target shape data of the work during the deformation processing. The "best-fit" itself cannot be conducted in the case where no similarity point is present such as the case where no hole is present in the work, where an outer peripheral edge of the work is cut off (trimmed off) after the deformation processing comes to an end or where any marker cannot be attached because the marker disrupts the deformation processing. The precision of the calculation of the necessary deformation amount necessary for deforming to the target shape of each of the plural positions of the work may be low or the calculation thereof may be unable.

An object of the present invention is to calculate the necessary deformation amount of the work that is necessary for deforming to the target shape, in a short time period and highly precisely in deformation processing of a work.

Means for Solving Problems

To solve the above technical object, according to an aspect of the present invention, there is provided a deformation processing support system that calculates a necessary deformation amount necessary for deforming from an intermediate shape to a target shape of a work based on a difference between the intermediate shape and the target shape thereof in deformation processing of the work, the system comprising a target shape data acquiring part that acquires target shape data of the work whose surface has a reference line disposed thereon, an intermediate shape data acquiring part that acquires intermediate shape data from the work having the intermediate shape whose surface has a reference line drawn thereon during the deformation processing, and a necessary deformation amount calculating part that puts the target shape data and the intermediate shape data side by side by positioning the reference lines relative to each other and that calculates the necessary deformation amount for each of plural positions on the work based on the difference between the target shape data and the intermediate shape data put side by side.

According to another aspect of the present invention, there is provided a deformation processing support method that calculates a necessary deformation amount necessary for deforming from an intermediate shape to a target shape of a work based on the difference between the intermediate shape and the target shape thereof in deformation processing of the work, the method comprising the steps of acquiring target shape data of the work whose surface has a reference line disposed thereon, drawing a reference line on a surface of the work before the deformation processing is started, acquiring intermediate shape data from the work having the intermediate shape whose surface has the reference line drawn thereon, during the deformation processing, putting the target shape data and the intermediate shape data side by side by positioning the reference lines relative to each other, and calculating the necessary deformation amount for each of plural positions on the work having the intermediate shape based on the difference between the target shape data and the intermediate shape data put side by side.

Effect of the Invention

According to the present invention, the necessary deformation amount of a work necessary for deforming to the target shape can be calculated in a short time period and highly precisely in the deformation processing of the work.

MODES FOR CARRYING OUT THE INVENTION

Figure 1:
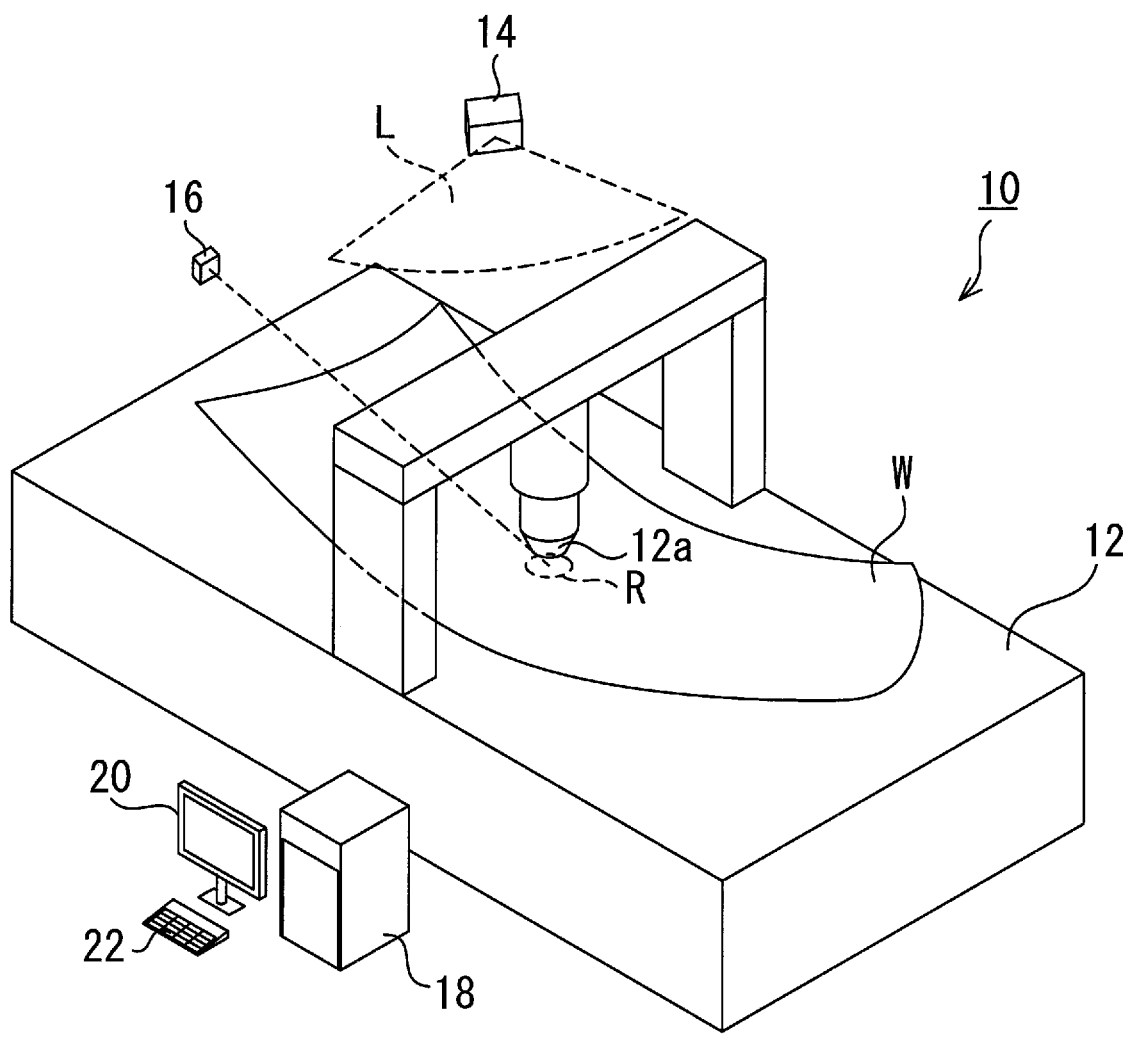
FIG. 1 is a schematic diagram of the configuration of a deformation processing support system according to a first embodiment of the present invention.

An aspect of the present invention is a deformation processing support system that calculates a necessary deformation amount necessary for deforming from an intermediate shape to a target shape of a work based on a difference between the intermediate shape and the target shape of the work in deformation processing of the work, the system comprising a target shape data acquiring part that acquires target shape data of the work whose surface has a reference line disposed thereon, an intermediate shape data acquiring part that acquires intermediate shape data from the work having an intermediate shape whose surface has a reference line drawn thereon during the deformation processing, and a necessary deformation amount calculating part that puts the target shape data and the intermediate shape data side by side by positioning the reference lines relative to each other and that calculates a necessary deformation amount for each of plural positions on the work based on the difference between the target shape data and the intermediate shape data put side by side.

According to this aspect, in the deformation processing of the work, the necessary deformation amount of the work necessary for deforming to the target shape can be calculated in a short time period and highly precisely.

A first and a second reference lines may be disposed on each of the surface of the target shape data and the surface of the work and, in this case, the necessary deformation amount calculating part may position the first reference lines of the target shape data and the intermediate shape data, and the second reference lines thereof relative to each other such that the first reference line on the target shape data and the first reference line on the intermediate shape data partially overlap with each other on one same plane and the second reference line on the target shape data and the second reference line on the intermediate shape data partially overlap with each other on one same plane.

Otherwise, the necessary deformation amount calculating part may position a reference line of the target shape data and a reference line of the intermediate shape data relative to each other such that a virtual straight line connecting both ends of the reference line to each other on the target shape data and a virtual straight line connecting both ends of the reference line to each other on the intermediate shape data overlap with each other on one same straight line and the target shape data and the intermediate shape data do not cross each other.

The deformation processing support system may include, as the intermediate shape data acquiring part, a 3D laser scanner that three-dimensionally measures the shape of the overall work, a camera that shoots the reference line on the work, a reference line shape data producing part that extracts the reference line from a shot image of the camera and produces reference line shape data, and an intermediate shape data producing part that produces the intermediate shape data by combining the three-dimensional measurement data of the 3D laser scanner and the reference line shape data with each other.

Otherwise, the deformation processing support system may include, as the intermediate shape data acquiring part, a camera that shoots the work having the intermediate shape from plural directions, and the intermediate shape data producing part that produces the intermediate shape data based on data of plural shot images shot from the plural directions by the camera.

The deformation processing support system may include a contour figure producing part that produces a contour figure based on the necessary deformation amount of each of the plural positions on the work calculated by the necessary deformation amount calculating part. A worker can make various reviews to finish the work W into the target shape by referring to this contour figure. As a result, the work W can be finished into an aimed shape in a short time period and efficiently.

Plural reference lines may be disposed by disposing grid lines on the overall surface of the target shape data and the overall surface of the work. For example, the target shape data and the intermediate shape data are put side by side by positioning these pieces of data using a reference line of a position at which the work cannot be bending-processed any more for the reason, for example, that the thickness is small, and the deformation amount necessary for deforming to the target shape of each of the other positions of the work can thereby be calculated. The degree of freedom is therefore improved concerning the manner of conducting the deformation processing of the work, compared to the case where the reference line is disposed on a portion of the surface of each of the target shape data and the work.

Another aspect of the present invention is a deformation processing support method of calculating the necessary deformation amount necessary for deforming from an intermediate shape to a target shape based on the difference between the intermediate shape and the target shape of a work in deformation processing of the work, and the deformation processing support method includes the steps of acquiring target shape data of the work whose surface has a reference line disposed thereon, drawing a reference line on a surface of the work before the deformation processing is started, acquiring intermediate shape data from the work having an intermediate shape whose surface has the reference line drawn thereon, during the deformation processing, putting the target shape data and the intermediate shape data side by side by positioning the reference lines relative to each other, and calculating the necessary deformation amount for each of plural positions on the work having the intermediate shape based on the difference between the target shape data and the intermediate shape data put side by side.

According to the other aspect, the necessary deformation amount of the work necessary for deforming to the target shape can be calculated in a short time period and highly precisely in the deformation processing of a work.

A first and a second reference lines may be disposed on each of the surface of the target shape data and the surface of the work and, in this case, positioning of the first reference lines and the second reference lines of the target shape data and the intermediate shape data relative to each other may be conducted such that the first reference line on the target shape data and the first reference line on the intermediate shape data partially overlap with each other on one same plane and the second reference line on the target shape data and the second reference line on the intermediate shape data partially overlap with each other on one same plane.

Otherwise, a reference line of the target shape data and a reference line of the intermediate shape data may be positioned relative to each other such that a virtual straight line connecting both ends of the reference line to each other on the target shape data and a virtual straight line connecting both ends of the reference line to each other on the intermediate shape data overlap with each other on one same straight line and the target shape data and the intermediate shape data do not cross each other.

To acquire the intermediate shape data, the intermediate shape data may be produced by three-dimensionally measuring the shape of the overall work using a 3D laser scanner, shooting the reference line on the work by a camera, producing reference line shape data by extracting the reference line from the shot image of the camera, and combining the three-dimensional measurement data of the 3D laser scanner and the reference line shape data with each other.

Otherwise, to acquire the intermediate shape data, the intermediate shape data may be produced based on data of the plural shot images of the work having the intermediate shape shot from plural directions by the camera.

A contour figure may be produced based on the necessary deformation amount calculated for each of the plural positions on the work. A worker can make various reviews to finish the work W into the target shape by referring to this contour figure. As a result, the work W can be finished into the aimed shape in a short time period and efficiently.

Plural reference lines may be disposed by disposing grid lines on the overall surface of the target shape data and the overall surface of the work. For example, the target shape data and the intermediate shape data are put side by side by positioning these pieces of data using a reference line of the position at which the work cannot be bending-processed any more for the reason, for example that the thickness is small, and the deformation amount necessary for deforming to the target shape of each of the other positions of the work can thereby be calculated. The degree of freedom is therefore improved concerning the manner of conducting the deformation processing of the work, compared to the case where the reference line is disposed on a portion of the surface of each of the target shape data and the work.

Embodiments of the present invention will be described below with reference to the drawings.

First Embodiment

Figure 2:
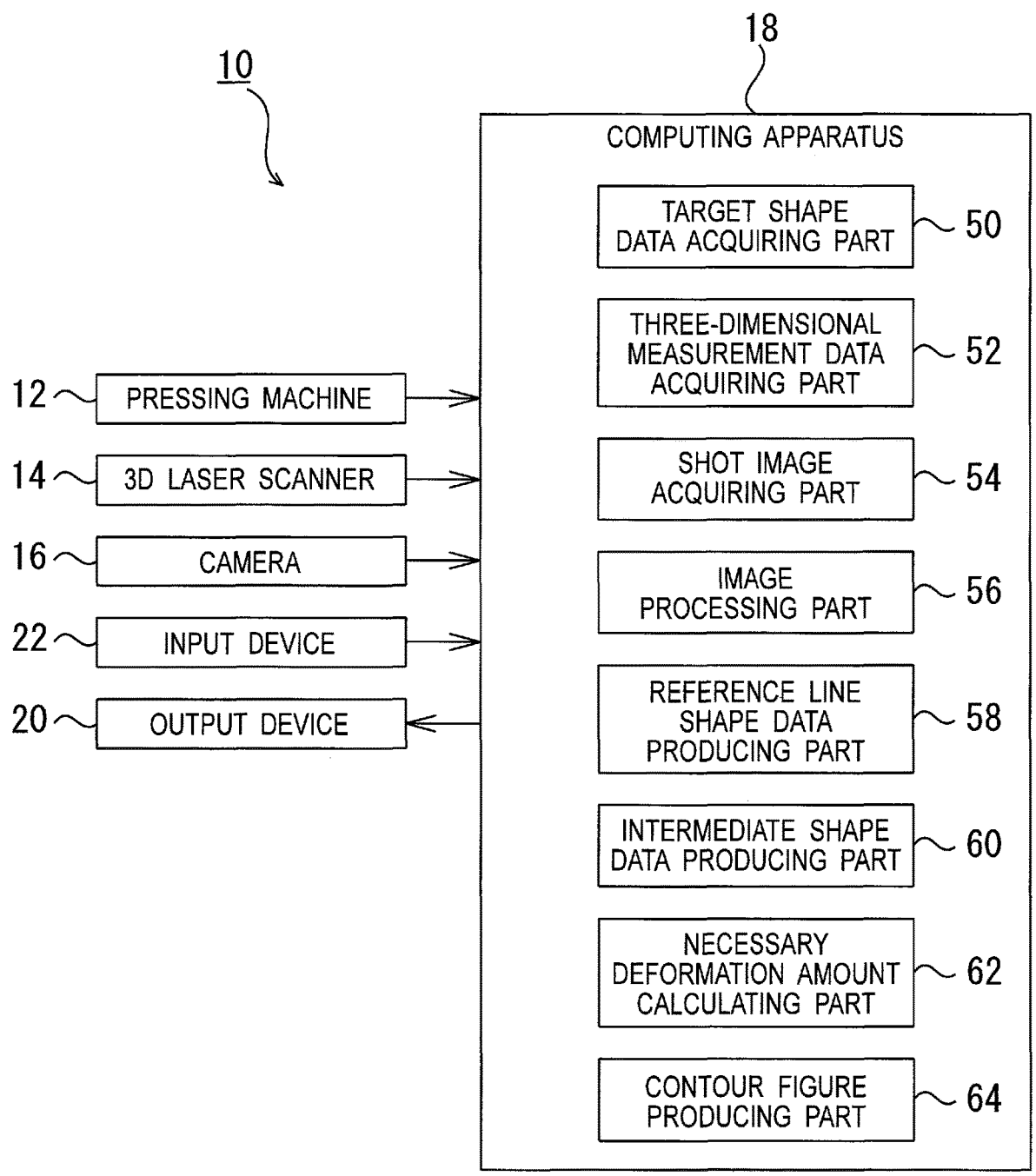
FIG. 2 is a block diagram of the deformation processing support system.

FIG. 1 schematically depicts the configuration of the deformation processing support system according to the first embodiment of the present invention. FIG. 2 is a block diagram of the deformation processing support system.

An overview of the deformation processing support system 10 according to this embodiment depicted in FIG. 1 and FIG. 2 will be described. The deformation processing support system 10 according to this embodiment is a system that supports deformation processing of the work W in which plural bending processing sessions are conducted for the work W. For example, though the details of the deformation processing support system 10 will be described later, the deformation processing support system 10 is a system that calculates the necessary deformation amount necessary for deforming from the intermediate shape to the target shape based on the intermediate shape (data) of the work W taken during the deformation processing and the target shape (data) of the work W.

In this embodiment, the work W before the deformation processing is started has a flat plate-like shape. The work W is made from an aluminum material. In this embodiment, the plural bending processing (deformation processing) sessions conducted for the work W are conducted by a pressing machine 12.

The pressing machine 12 conducts the bending processing for plural positions of the work W by pressing downward at each of the plural positions using an upper punch 12a. The overall work W is deformation-processed by conducting the bending processing for each of the plural positions of the work W.

As to this deformation processing of the work W, the case may be present where, during the deformation processing (such as, for example, between the end of a certain bending processing session and the start of the succeeding bending processing session), a worker desires to know the deformation amount of the work W necessary for deforming from the intermediate shape to the target shape, that is, the necessary deformation amount for each of the plural positions of the work W. The deformation processing support system 10 of this embodiment calculates the deformation amount for each of the plural positions of the work W necessary for deforming from the intermediate shape to the target shape.

To execute this, the deformation processing support system 10 according to this embodiment includes a 3D laser scanner 14 that measures the shape (the three-dimensional shape) of the work W during the deformation processing, a camera 16 that shoots the work W during the deformation processing, and a computing apparatus 18.

The three-dimensional laser scanner 14 is a non-contact three-dimensional measuring apparatus that scans the overall work W using a laser light beam L, that measures the distance to the work W based on a reflected light beam from the work W, and that three-dimensionally measures the shape of the work W based on the measured distance. The 3D laser scanner 14 three-dimensionally measures the overall work W having the intermediate shape after a predetermined number of bending processing sessions are conducted for the work W or at an optional timing designated by the worker, that is, when the upper punch 12a of the pressing machine 12 is away from the work W. The three-dimensional measurement data is sent to the computing apparatus 18.

In this embodiment, the camera 16 shoots portions of the work W. The camera 16 shoots, for example, a portion R of the work W located immediately beneath the upper punch 12a of the pressing machine 12. When the upper punch 12a of the pressing machine 12 is away from the work W, the camera 16 shoots the portion R of the work W having the intermediate shape immediately after being bending-processed by the upper punch 12a, as a shot area R. The shot image (data) of the camera 16 is sent to the computing apparatus 18. Though the reason will be described later, it is preferred that the camera 16 have high resolution as far as possible.

As depicted in FIG. 2, the computing apparatus 18 is connected to the pressing machine 12, the 3D laser scanner 14, and the camera 16. When the computing apparatus 18 receives from the pressing machine 12 a signal that indicates that the upper punch 12a is away from the work W (a bending processing end signal), the computing apparatus 18 sends a measurement execution signal to the 3D laser scanner 14 and sends a shooting execution signal to the camera. The computing apparatus 18 acquires the three-dimensional measurement data of the work W having the intermediate shape from the 3D laser scanner 14 that already executes the three-dimensional measurement, and acquires the shot image data of the work W having the intermediate shape from the camera 16 that already executes the shooting. Based on these pieces of data, the computing apparatus 18 calculates the necessary deformation amount necessary for deforming from the intermediate shape to the target shape for each of the plural positions of the work W. In this embodiment, the computing apparatus 18 is configured to output the calculated necessary deformation amount to the worker through an output device 20 (such as, for example, a display). The computing apparatus 18 will be described below in detail.

As depicted in FIG. 2, the computing apparatus 18 includes a target shape data acquiring part 50 that acquires the target shape data of the work W, a three-dimensional measurement data acquiring part 52 that acquires the three-dimensional measurement data of the work W from the 3D laser scanner 14, a shot image acquiring part 54 that acquires the shot images of the work W from the camera 16, an image processing part 56 that image-processes the acquired shot images, a reference line shape data producing part 58 that produces reference line shape data from the image-processed shot images, an intermediate shape data producing part 60 that produces the intermediate shape data based on the three-dimensional measurement data and the line shape data, a necessary deformation amount calculating part 62 that calculates the necessary deformation amount of the work W necessary for deforming from the intermediate shape to the target shape, and a contour figure producing part 64 that produces a contour figure based on the calculated necessary deformation amount.

Figure 3:
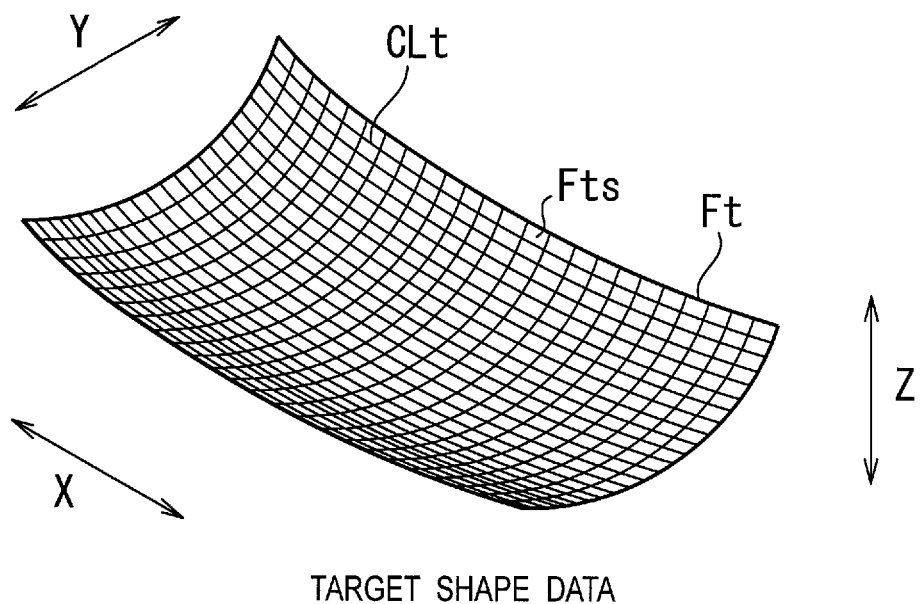
FIG. 3 is a diagram of target shape data.

As depicted in FIG. 3, the target shape data acquiring part 50 of the computing apparatus 18 acquires the target shape data Ft of the work W. The target shape data Ft is 3D CAD data that indicates, for example, the shape of the completed article of the work W, that is, the shape acquired after the deformation processing comes to an end. The target shape data acquiring part 50 acquires the 3D CAD data from, for example, a CAD apparatus (depicted) connected to the computing apparatus 18. The X-direction, the Y-direction, and the Z-direction depicted in FIG. 3 respectively indicate the width direction, the depth direction, and the thickness direction in the case where the work W has a flat plate shape.

Though the reason will be described later, the target shape data Ft of the work W includes plural crossing lines CLt (that is, the first and the second reference lines that cross each other) on the surface Fts thereof. In this embodiment, the plural crossing lines CLt are included in the grid lines drawn on an overall surface Fts of the target shape data Ft (the grid lines constituted by the plural first reference lines and the plural second reference lines). The plural crossing lines CLt are arranged on the overall surface Fts of the target shape data Ft.

Figure 4:
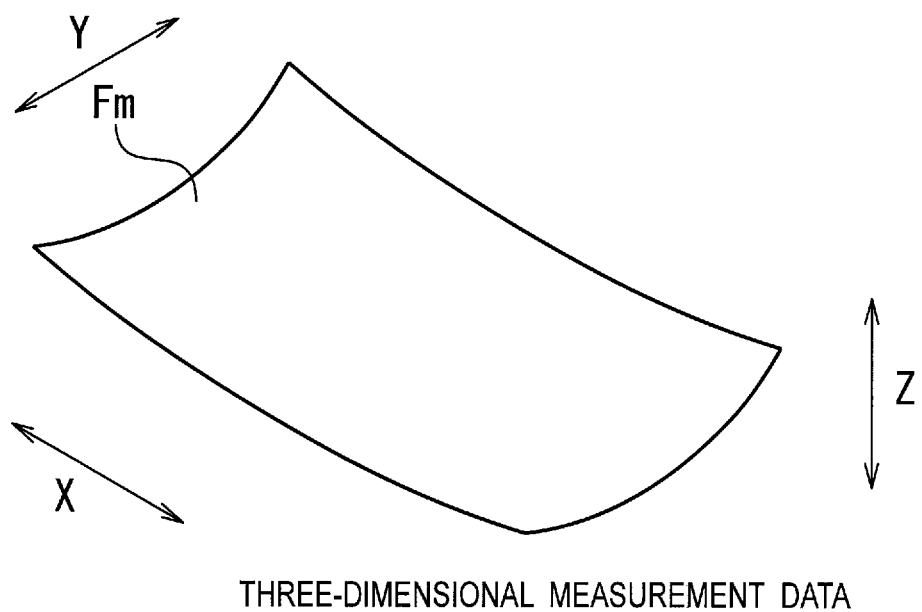
FIG. 4 is a diagram of three-dimensional measurement data.

As depicted in FIG. 4, the three-dimensional measurement data acquiring part 52 of the computing apparatus 18 acquires the three-dimensional measurement data Fm of the work W from the 3D laser scanner 14. The three-dimensional measurement data Fm is, for example, point group data.

Figure 6:
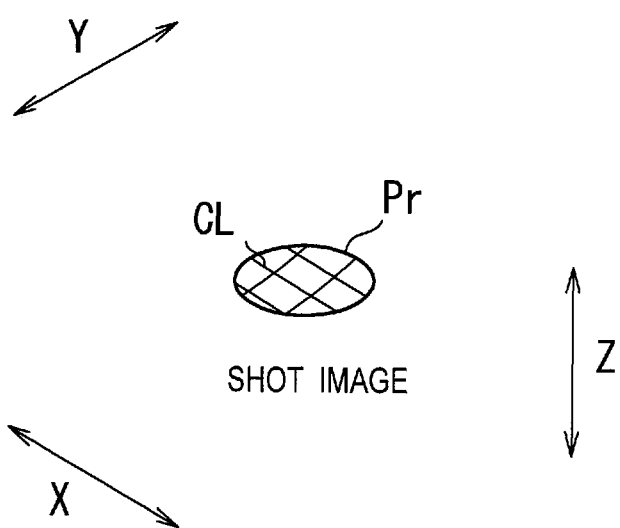
FIG. 6 is a diagram of a shot image of a camera.

Though the reason will be described later, as depicted in FIG. 6, plural crossing lines CL (that is, the first and the second reference lines that cross each other) are drawn on the surface Ws of the actual work W. For example, the plural crossing lines CL are scratch lines that are maintained without being erased during the deformation processing. In this embodiment, the plural crossing lines CL are included in the grid lines drawn on the surface Ws of the work W (the grid lines constituted by the plural first reference lines and the plural second reference lines). The plural crossing lines CL are arranged on the overall surface Ws of the work W.

As depicted in FIG. 4, the three-dimensional measurement data Fm of the work W measured by the 3D laser scanner 14 does not indicate the plural crossing lines CL. Because the recesses and protrusions of the grid lines drawn on the surface Ws of the work W (the plural crossing lines CL) are small, the 3D laser scanner 14 cannot detect the grid lines and the three-dimensional measurement data Fm does not substantially indicate any of the grid lines. To cope with this, though the reason will be described later, the camera 16 shoots portions of the work W.

The grid lines on the surface Fts of the target shape data Ft (the plural crossing lines CLt) and the grid lines on the surface Ws of the work W (the plural crossing lines CL) substantially correspond to each other. For example, the pitch of the grid lines of the work W is set to be small compared to the pitch of the grid lines of the target shape data Ft taking into consideration the elongation that occurs when the work W is deformation-processed from the flat plate-like shape to the target shape.

As depicted in FIG. 6, the shot image acquiring part 54 of the computing apparatus 18 acquires a shot image Pr of the work W from the camera 16. In this embodiment, as depicted in FIG. 1, the camera 16 shoots the shot area R immediately beneath the upper punch 12*a* of the pressing machine 12 and a shot image Pr thereof is therefore a partial shot image of the work W. As depicted in FIG. 6, the shot image Pr has the grid lines drawn on the surface Ws of the work W (the plural crossing lines CL) shown therein.

The image processing part 56 of the computing apparatus 18 image-processes the shot image Pr to extract the crossing lines CL shown in the shot image Pr of the camera 16. For example, the image processing part 56 executes adjustment of the brightness and the contrast, and the contour enhancement correction for the shot image Pr. The adjustment of the parameters such as the brightness and the contrast in the image processing may be set to be able to be conducted by a worker through an input device 22 (such as, for example, a keyboard) connected to the computing apparatus 18. To execute this, the computing apparatus 18 outputs the shot image Pr of the camera 16 to the worker through the output device 20.

Figure 7:
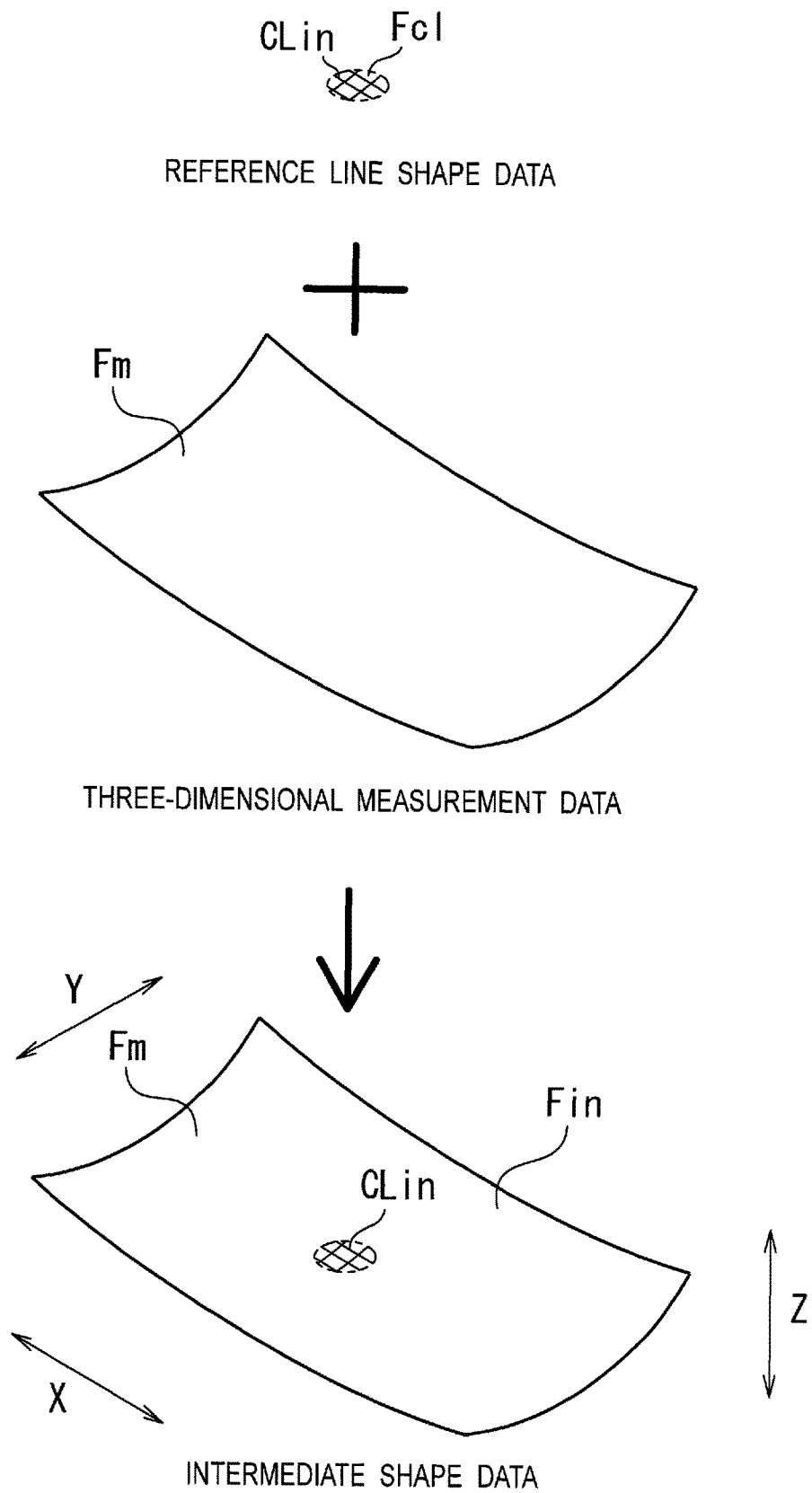
FIG. 7 is a diagram for explaining production of intermediate shape data.

As depicted in FIG. 7, the reference line shape data producing part 58 of the computing apparatus 18 extracts the crossing lines CL shown in the image-processed shot image Pr of the camera 16 (that is, the first reference lines and the second reference lines that cross each other) and thereby produces reference line shape data Fcl thereof. The reference line shape data Fcl is three-dimensional shape data and is produced from the two-dimensional shot image Pr based on the positional relation between the camera 16 and the shooting area thereof (the area R). To highly precisely produce the reference line shape data Fcl, plural cameras 16 may be present. Each of the plural cameras 16 shoots the shooting area R that is common thereto, from a direction different from that of each other, and the three-dimensional reference line shape data Fcl is produced from the plural shot images whose shooting directions are each different from each other.

As depicted in FIG. 7, the intermediate shape data producing part 60 of the computing apparatus 18 combines the three-dimensional measurement data Fm acquired from the 3D laser scanner 14 by the three-dimensional measurement data acquiring part 52 and the reference line shape data Fcl produced by the reference line shape data producing part 58 with each other. This combination produces shape data (intermediate shape data) Fin of the work W having the intermediate shape that partially includes crossing lines CLin. The reference line shape data Fcl is arranged on the intermediate shape data Fin to correspond to the relative position of the shot area R of the camera 16 relative to the overall work W based on the relative positional relation between the 3D laser scanner 14 and the camera 16.

The necessary deformation amount calculating part 62 of the computing apparatus 18 calculates the necessary deformation amount necessary for deforming from the intermediate shape to the target shape for each of the plural positions of the work W based on the target shape data Ft acquired by the target shape data acquiring part 50 and the intermediate shape data Fin produced by the intermediate shape data producing part 60.

Figure 8:
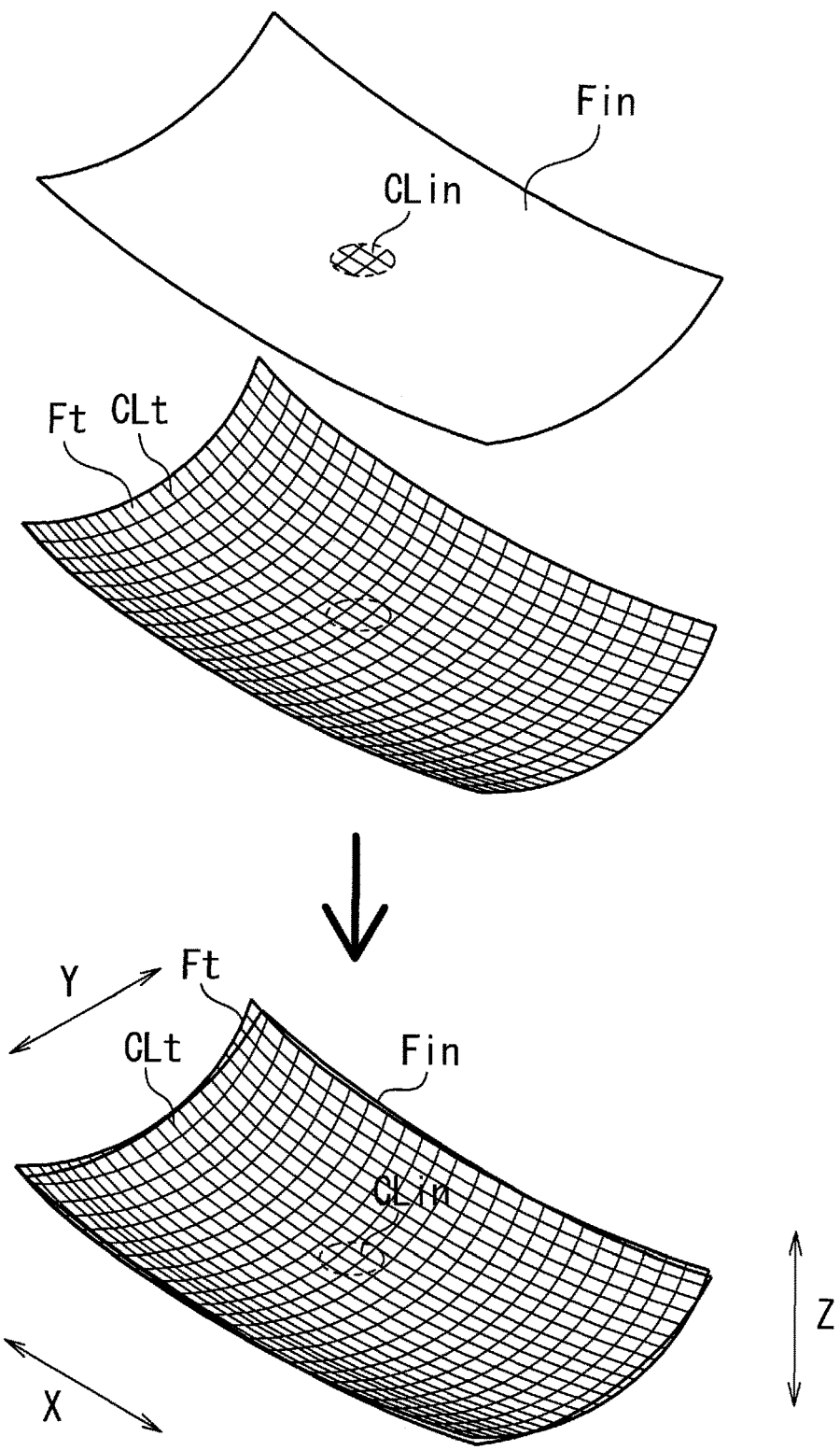
FIG. 8 is a diagram for explaining overlapping of the target shape data and the intermediate shape data with each other.

For explanation, as depicted in FIG. 8, the necessary deformation amount calculating part 62 positions the crossing lines CLin of the intermediate shape data Fin and the corresponding crossing lines CLt of the target shape data Ft relative to each other and thereby puts side by side (causes to overlap with each other) the intermediate shape data Fin and the target shape data Ft.

To position the crossing lines CLin of the intermediate shape data Fin and the corresponding crossing lines CLt of the target shape data Ft relative to each other, each of the plural crossing lines CL of the work W and each of the crossing lines CLt of the target shape data Ft are adapted to be distinguishable from each other. For example, the thickness, the shape (such as, for example, dotted line), and the like of each of the first and the second reference lines constituting the crossing lines differ from each other. For example, a reference numeral is given to each of the crossing lines (for the work W, characters such as numbers and alphabets, and symbols are inscribed thereon).

Instead, when the output device 20 is a display, the worker may teach the computing apparatus 18 the crossing lines Clt of the target shape data Ft corresponding to the crossing lines CLin of the intermediate shape data Fin through the input device 22, on a screen of the display.

Figure 9:
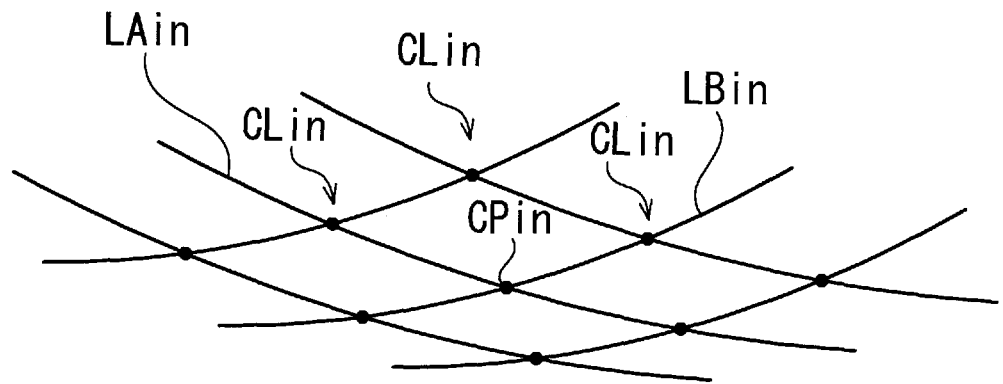
FIG. 9 is a diagram of crossing lines of the intermediate shape data and crossing lines of the target shape data taken before being positioned relative to each other.
Figure 9:
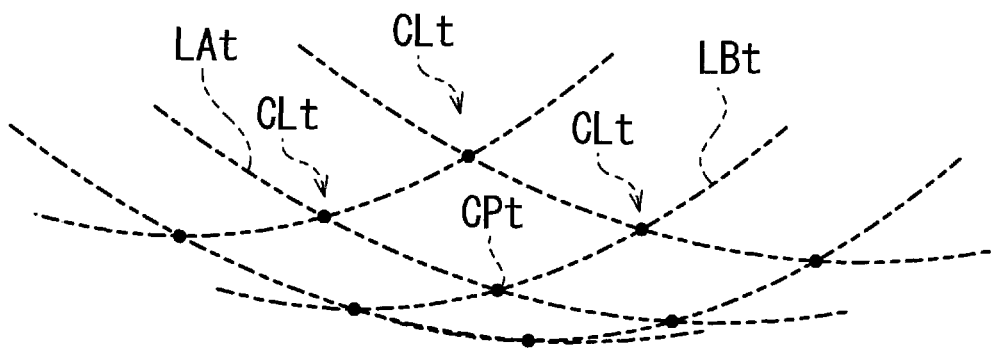

For further explanation, as depicted in FIG. 9, the curvatures of the first and the second reference lines constituting the crossing lines CLin of the intermediate shape data Fin and the curvatures of the first and the second reference lines constituting the corresponding crossing lines CLt of the target shape data Ft differ from each other in a precise sense. For example, the curvature differs between the first and the second reference lines LAin and LBin constituting a certain crossing line Clin of the intermediate shape data Fin and the first and the second reference lines LAt and LBt constituting the corresponding crossing line CLt of the target shape data Ft. The crossing line CLin of the intermediate shape data Fin and the crossing line CLt of the target shape data Ft therefore do not completely overlap with each other in their entireties, and are positioned relative to each other to partially overlap with each other.

Positioning will be described as an example, that uses the first and the second reference lines LAin and LBin of a certain crossing line CLin of the intermediate shape data Fin, and the first and the second reference lines LAt and LBt of the corresponding crossing line CLt of the target shape data Ft.

Figure 10:
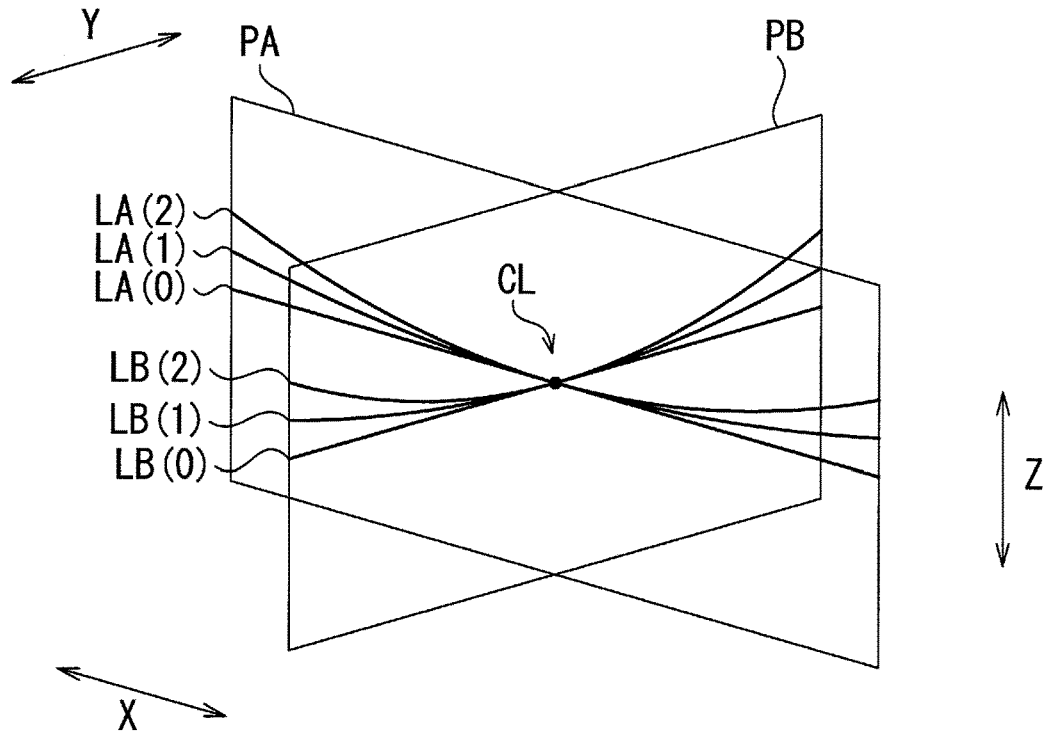
FIG. 10 is a diagram of variation of crossing lines on a work during the deformation processing.

Consideration will be made for the first and the second reference lines LA and LB of the crossing lines CL on the surface Ws of the work W, that correspond to the first and the second reference lines LAin and LBin of the crossing lines CLin of the intermediate shape data Fin as depicted in FIG. 10. Lines LA(0) and LB(0) indicate the first and the second reference lines LA and LB taken before the deformation processing is started for the work W. Lines LA(1) and LB(1) indicate the first and the second reference lines LA and LB taken when the bending processing is already conducted for the work W. Lines LA(2) and LB(2) indicate the first and the second reference lines LA and LB taken when further bending processing is conducted from the above state.

As depicted in FIG. 10, the curvatures of the first and the second reference lines LA and LB of the crossing lines CL of the work W are increased every time the bending processing is conducted. When the length of each of the first and the second reference lines LA and LB is minute (that is, when this length is set to be the shortest length as far as possible capable of being recognized in the shot image of the camera 16), it can be deemed that the first reference line LA is deformed in a plane PA and the second reference line LB is deformed in a plane PB (it is premised that the position of the work W is not changed).

Figure 11:
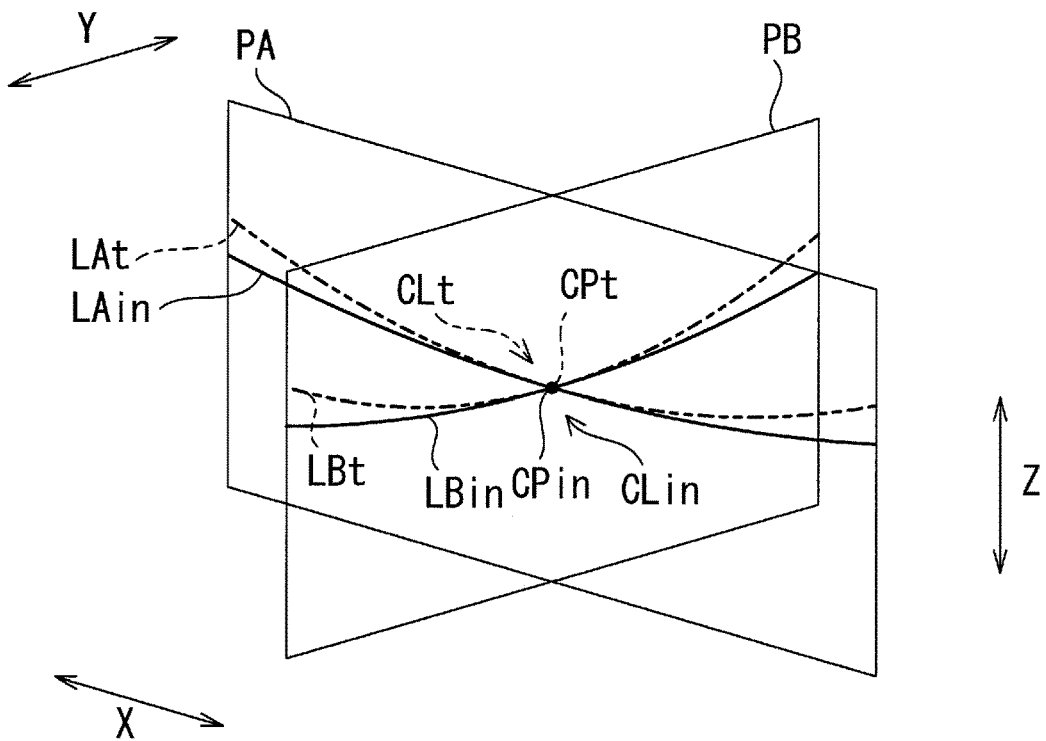
FIG. 11 is a diagram of the crossing lines of the intermediate shape data and the crossing lines of the target shape data acquired after being positioned relative to each other.

As depicted in FIG. 11, it can therefore be deemed that the first reference line LAin of the crossing lines CLin on the intermediate shape data Fin and the first reference line LAt of the crossing lines CLt on the target shape data Ft each corresponding to the first reference line LA of the crossing lines CL of the work W are present in the one same plane PA. Similarly, it can be deemed that the second reference line LBin of the intermediate shape data Fin and the second reference line LBt of the target shape data Ft each corresponding to the second reference line LB of the work W are present in the one same plane PB.

When the first reference line LAt of the crossing lines CLt on the target shape data Ft, and the first reference line LAin of the crossing lines CLin on the intermediate shape data Fin are set to partially overlap with each other on the one same plane PA and the second reference line LBt of the crossing lines CLt on the target shape data Ft and the second reference line LBin of the crossing lines CLin on the intermediate shape data Fin are set to partially overlap with each other on the one same plane PB, the crossing lines Clt of the target shape data Ft and the crossing lines CLin of the intermediate shape data Fin are positioned relative to each other as depicted in FIG. 11. The first reference line LAt of the target shape data Ft and the first reference line LAin of the intermediate shape data Fin are positioned relative to each other, and the second reference line LBt of the target shape data Ft and the second reference line LBin of the intermediate shape data Fin are positioned relative to each other. As a result, the target shape data Ft and the intermediate shape data Fin are properly overlapped with each other.

The target shape data Ft and the intermediate shape data Fin properly overlapped with each other correspond to the shape of the work W taken when the work W is deformation-processed in the state where the crossing lines CL of the work W are fixed that correspond to the crossing lines CLt of the target shape data Ft and the crossing lines CLin of the intermediate shape data Fin that are positioned relative to each other.

When the target shape data Ft and the intermediate shape data Fin are properly put side by side (overlapped with each other) by positioning the crossing lines CLt and CLin relative to each other, the necessary deformation amount calculating part 62 calculates the necessary deformation amount necessary for deforming from the intermediate shape to the target shape for each of the plural positions on the work W.

For example, as depicted in FIG. 8, the necessary deformation amount calculating part 62 calculates the distance between each of the plural positions on the target shape data Ft and the corresponding position on the intermediate shape data Fin based on the difference between the target shape data Ft and the intermediate shape data Fin overlapped with each other, as the necessary deformation amount necessary for deforming to the target shape for the corresponding position on the work W.

Figure 12:
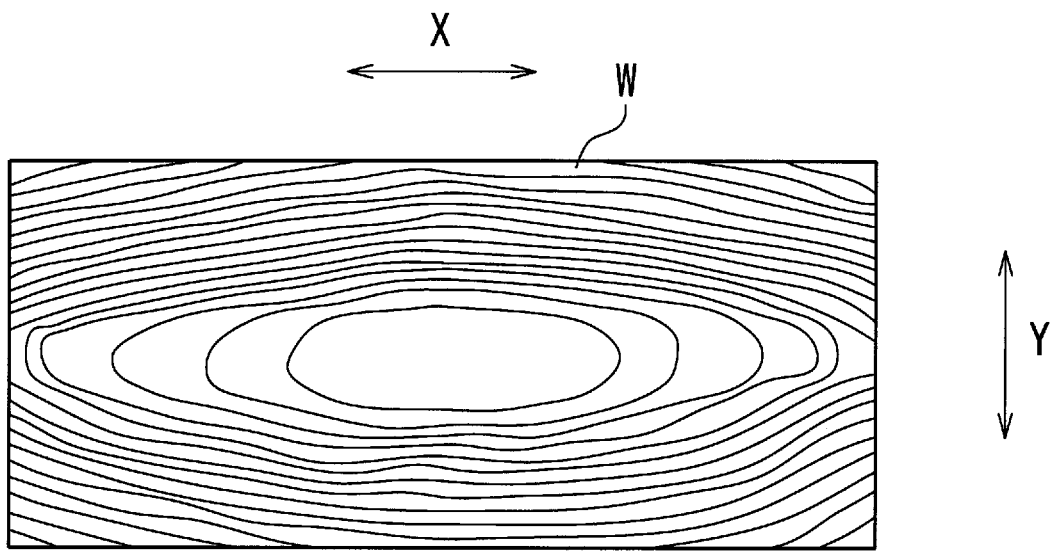
FIG. 12 is a diagram of an example of a contour figure.

As depicted in FIG. 12, the contour figure producing part 64 produces a contour figure (a contour drawing) based on the necessary deformation amount necessary for deforming to the target shape for each of the plural positions on the work W calculated by the necessary deformation amount calculating part 62. The produced contour figure is output to the worker through the output device 20. The worker can make various reviews to finish the work W into the target shape by referring to the contour figure. As a result, the work W can be finished into the aimed shape in a short time period and efficiently.

Figure 13:
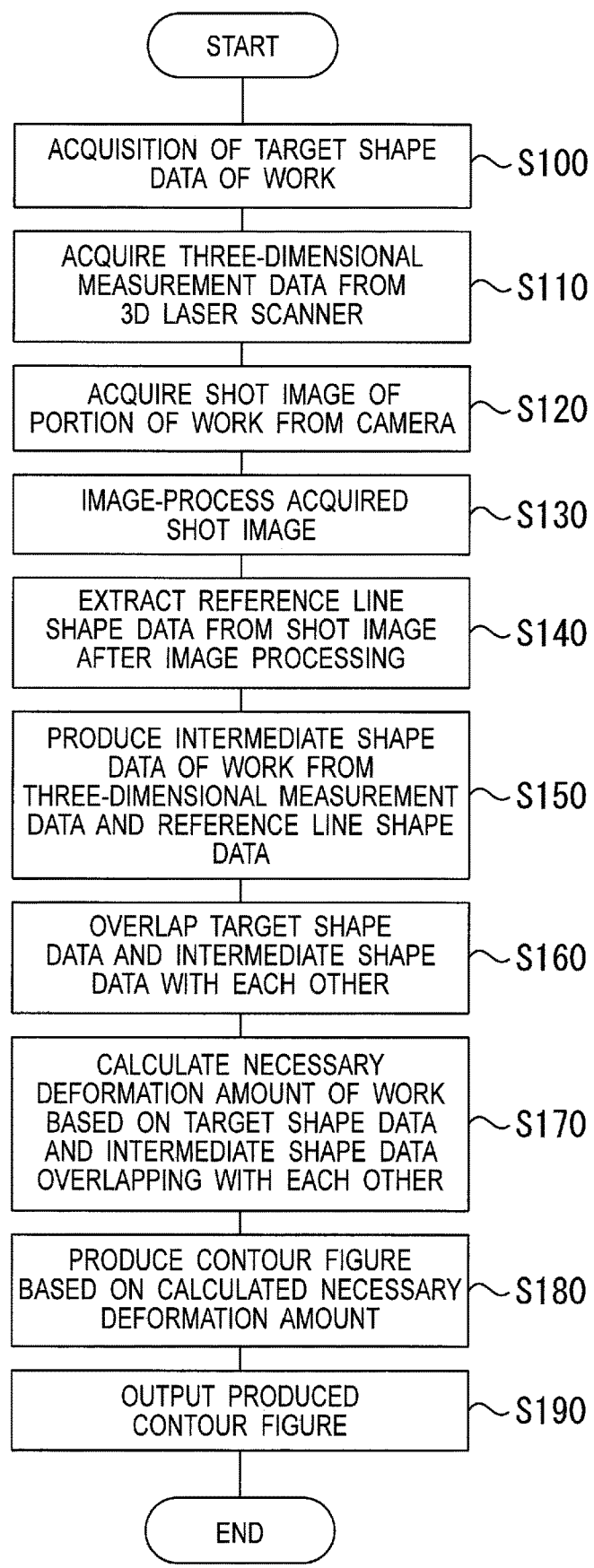
FIG. 13 is a flowchart of an example of a flow of an operation of the deformation processing support system.

An example of the flow of the operation of the computing apparatus 18 of the deformation processing support system 10 will be described with reference to a flowchart depicted in FIG. 13.

At step S100, the computing apparatus 18 of the deformation processing support system 10 first acquires the target shape data Ft of the work W to be deformation-processed as depicted in FIG. 3.

At step S110, the computing apparatus 18 acquires the three-dimensional measurement data Fm as depicted in FIG. 4 from the 3D laser scanner 14 that already executes the three-dimensional measurement for the work W having the intermediate shape.

At step S120, the computing apparatus 18 acquires the partial shot image Pt of the work W as depicted in FIG. 6 from the camera 16 that already shoots a portion of the work W having the intermediate shape.

At step S130, the computing apparatus 18 image-processes the shot image Pr of the camera 16 acquired at step S120.

At step S140, the computing apparatus 18 extracts the crossing lines CL (that is, the first and the second reference lines that cross each other) from the image-processed shot image Pr to produce the reference line shape data Fcl thereof.

At step S150, as depicted in FIG. 7, the computing apparatus 18 combines the three-dimensional measurement data Fm of the work W having the intermediate shape that is acquired at step S110 and the reference line shape data Fcl produced at step S140 with each other to produce the intermediate shape data Fin.

At step S160, the computing apparatus 18 overlaps (puts side by side) the target shape data Ft acquired at step S100 and the intermediate shape data Fin produced at step S150 with each other by, as depicted in FIG. 8, positioning the crossing lines CLin and CLt relative to each other.

At step S170, the computing apparatus 18 calculates the necessary deformation amount necessary for deforming from the intermediate shape to the target shape for each of the plural positions of the work W based on the difference between the target shape data Ft and the intermediate shape data Fin that are overlapped with each other at step S160.

At step S180, the computing apparatus 18 produces the contour figure as depicted in FIG. 12 based on the necessary deformation amount calculated at step S170.

At S190, the computing apparatus 180 outputs the contour figure produced at step S180 to the worker through the output device 20 depicted in FIG. 1.

According to this embodiment, in the deformation processing of the work W, the necessary deformation amount of the work W necessary for deforming to the target shape can be calculated in a short time period and highly precisely.

Figure 5:
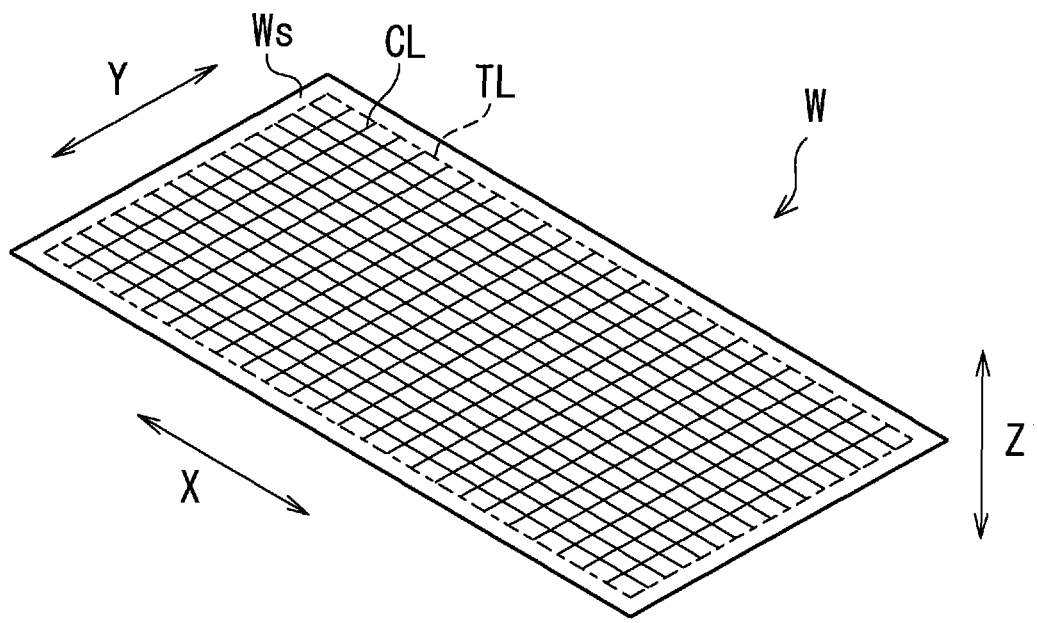
FIG. 5 is a diagram of a work before deformation processing is started.

In this embodiment, as depicted in FIG. 3 and FIG. 5, the plural crossing lines CLt (that is, the grid lines constituted by the plural first reference lines and the plural second reference lines) are disposed on the overall surface Fts of the target shape data Ft of the work W and, similarly, the corresponding plural crossing lines CL (that is, the grid lines constituted by the plural first reference lines and the plural second reference lines) are disposed also on the overall surface Fs of the work W. The plural first and the plural second reference lines constituting the plural crossing lines are disposed on the overall surface Fts of the target shape data Ft of the work W and the overall surface Fs of the work W. Relative to any optional crossing line of the target shape data Ft, the corresponding crossing line of the intermediate shape data Fin can thereby be positioned. The necessary deformation amount for deforming to the target shape can thereby be calculated for each of the rest of the positions relative to an optional position of the work W (setting the necessary deformation amount to be zero for the optional position). Positioning is executed using the crossing line at the position at which the bending processing cannot be conducted any more due to the reason, for example, that the thickness is small, the target shape data and the intermediate shape data are thereby overlapped with each other, and the necessary deformation amount necessary for deforming to the target shape can thereby be calculated for each of the other positions of the work. The degree of freedom is therefore improved concerning the manner of conducting the deformation processing for the work, compared to the case where the crossing lines are disposed on a portion of the surface of each of the target shape data and the work.

In this embodiment, the intermediate shape data Fin as depicted in FIG. 7 is acquired by the three-dimensional measurement data Fm of the 3D laser scanner 14, the shot image Pr of the camera 16, the reference line shape data producing part 58 of the computing apparatus 18 that extracts the crossing lines (that is, the first and the second reference lines that cross each other) from the shot image Pr and that thereby produces the reference line shape data Fcl, and the intermediate shape data producing part 60 of the computing apparatus 18 that produces the intermediate shape data Fin from the three-dimensional measurement data Fm and the reference line shape data Fcl. These parts function as the intermediate shape data acquiring part.

The intermediate shape data of the work W having a large shape can be produced in a short time period by using the 3D laser scanner 14 as a means of acquiring the intermediate shape data.

In addition, in this embodiment, the contour figure is produced based on the necessary deformation amount for deforming to the target shape for each of the plural positions on the work having the intermediate shape. The worker referring to the contour figure can intuitively learn the information such as the state of the overall work having the intermediate shape and the positions at which the bending processing needs to be conducted thereafter and the bending processing amounts thereof.

Second Embodiment

A deformation processing support system according to this embodiment differs from the deformation processing support system according to the first embodiment in that the manner of positioning the reference lines of the target shape data and the reference lines of the intermediate shape data relative to each other, executed by the necessary deformation amount calculating part of the computing apparatus is different. This different manner of positioning will therefore be described.

In the first embodiment, as depicted in FIG. 11, using the first and the second reference lines of each of the surface of the target shape data and the surface of the intermediate shape data, that is, using the two reference lines each thereof, the positioning of the reference lines of the target shape data and the reference lines of the intermediate shape data relative to each other is executed. In contrast, in this embodiment, using one reference line on the surface of the target shape data and the corresponding one reference line on the surface of the intermediate shape data, the positioning of the reference line of the target shape data and the reference line of the intermediate shape data relative to each other is executed.

Figure 14:
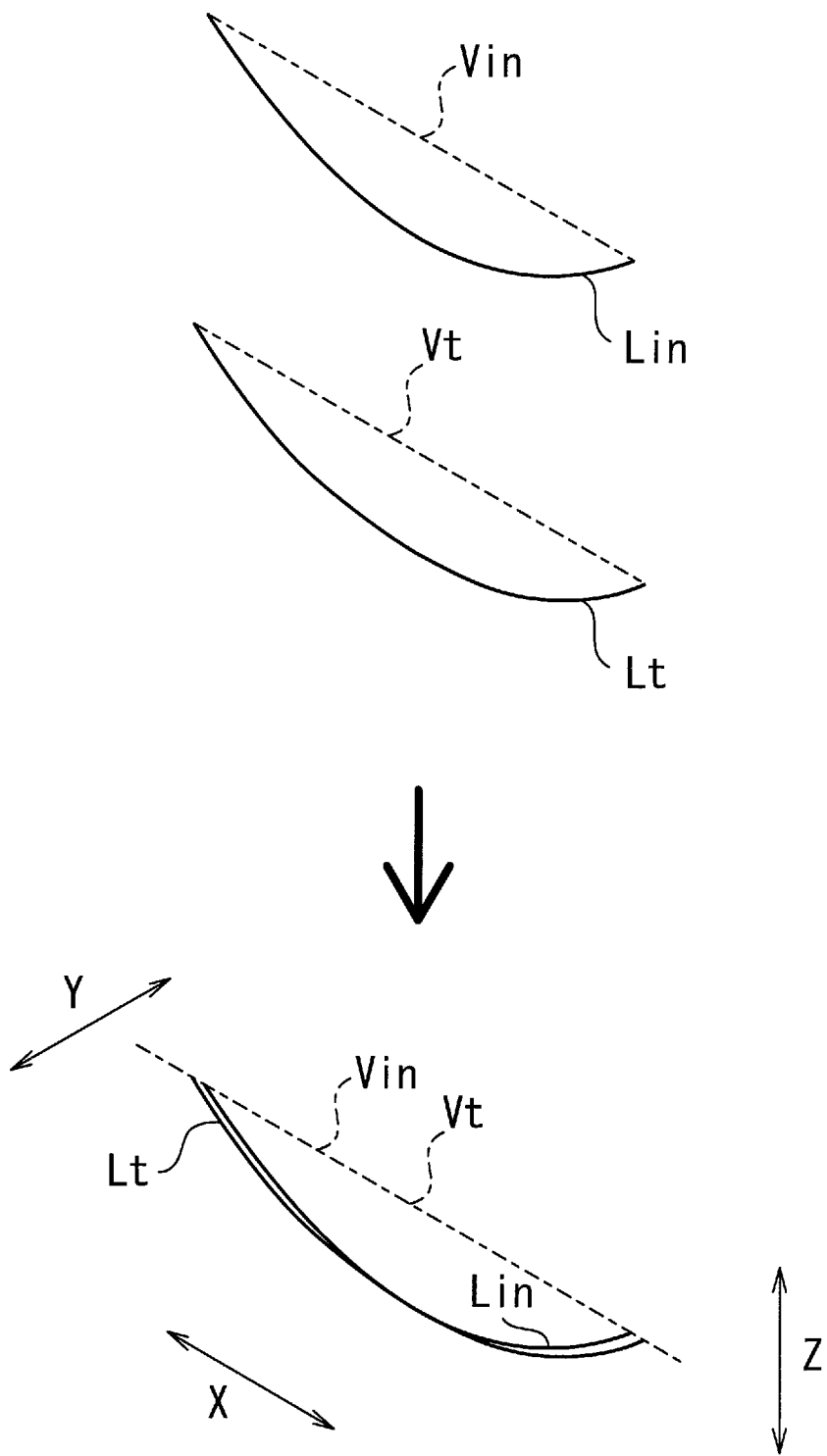
FIG. 14 is a diagram for explaining positioning of a reference line of the intermediate shape data and a reference line of the target shape data relative to each other in a deformation processing support system according to a second embodiment of the present invention.

As depicted in FIG. 14, the necessary deformation amount calculating part of the computing apparatus first calculates a virtual straight line Vt that connects both ends of the one reference line Lt of the target shape data and also calculates a virtual straight line Vin that connects both ends of the corresponding one reference line Lin of the intermediate shape data. The necessary deformation amount calculating part puts the target shape data and the intermediate shape data side by side such that the calculated virtual straight lines Vt and Vin overlap with each other on one same straight line. In the state where the virtual straight lines Vt and Vin overlap with each other on the one same straight line, the necessary deformation amount calculating part calculates the posture of each of the target shape data and the intermediate shape data relative to the virtual straight lines Vt and Vin such that the target shape data and the intermediate shape data do not cross each other. The reference line Lt of the target shape data and the reference line Lin of the intermediate shape data are thereby positioned relative to each other and, as a result, the target shape data and the intermediate shape are properly put side by side.

To describe from another viewpoint, the reference line Lt of the target shape data and the reference line Lin of the intermediate shape data are positioned relative to each other by the fact that the virtual straight lines Vt and Vin overlap with each other on the one same straight line, and the reference line Lt of the target shape data, the reference line Lin of the intermediate shape data, and the virtual straight lines Vt and Vin are present in one same plane.

Furthermore, for the target shape data and the intermediate shape data to more properly be overlapped with each other, it is preferred that the middle points of the virtual straight lines Vt and Vin match with each other.

Similar to the first embodiment, in this embodiment, the necessary deformation amount of the work necessary for deforming to the target shape can be calculated in a short time period and highly precisely in the deformation processing of the work.

The present invention has been described with reference to the embodiments while the embodiments of the present invention are not limited to the above.

For example, in the embodiments, because the precision of the three-dimensional measurement of the 3D laser scanner 14 is low, that is, because the reference lines on the work W cannot be detected, the camera 16 is supplementally used as a means to detect the reference lines. When the 3D laser scanner 14 can detect the reference lines on the work W, that is, when the reference lines are indicated in the three-dimensional measurement data, the camera 16 may not be used. The 3D laser scanner 14 functions as the means of acquiring the intermediate shape data of the work including the reference lines.

For description concerning this, the work having the intermediate shape can be shot by the camera from plural directions without using the 3D laser scanner and the intermediate shape data of the work can be produced based on the data of the plural shot images. For example, the computing apparatus includes the intermediate shape data producing part that extracts partial shapes of the work from the shot images, that combines pieces of extracted partial shape data into one, and that thereby produces the intermediate shape data. In this case, not only the partial shapes of the work but also the shapes of the reference lines on the work can be extracted from the shot images of the camera.

As a result, the intermediate shape data whose surface includes the reference lines can be acquired.

In the embodiments, the deformation processing (the plural bending processing sessions) of the work is conducted by the pressing machine while the processing in the embodiments of the present invention is not limited to this. For example, spinning processing may be employed. In the broad sense, the embodiments of the present invention relate to the deformation processing of a work that varies the shape of the work without removing any portion of the work.

It is preferred that the reference lines disposed on the surface of the target shape data and the surface of the work (in the first embodiment, the crossing lines constituted by the first and the second reference lines) be disposed taking into consideration the direction of the bending of the work. In the first embodiment, as depicted in FIG. 10, it is preferred that the crossing lines be disposed on the surface of the target shape data and the surface of the work such that each of the first and the second reference lines constituting the crossing lines is deformed on substantially one same plane during the deformation processing of the work. The positioning of the crossing lines of the target shape data and the crossing lines of the intermediate shape data relative to each other can thereby be highly precisely executed and, as depicted in FIG. 8, the target shape data and the intermediate shape data can thereby be highly precisely overlapped with each other. As a result, the necessary deformation amount can highly precisely be calculated for deforming to the target shape for each of the plural positions of the work.

In the first embodiment, the target shape data and the intermediate shape data are overlapped with each other being positioned relative to each other using the crossing lines of each of the target shape data and the intermediate shape data of the work, that is, the first and the second reference lines that cross each other while the positioning of the embodiments of the present invention is not limited to this. The first and the second reference lines that are used in the overlapping of the target shape data and the intermediate shape data with each other and that are disposed on the surface of each thereof may not cross each other on the surface. In this case, similarly to the case where the first and the second reference lines cross each other as in the embodiments, the target shape data and the intermediate shape data can be overlapped with each other being positioned relative to each other.

As above, the embodiments have been described as exemplification of the technique of the present invention. To accomplish this, the accompanying drawings and the detailed description have been presented. To exemplify the technique, not only the constituent components essential to solve the object but also the constituent components not essential to solve the object may therefore be included in the constituent components depicted and described in the accompanying drawings and the detailed description. It should therefore not readily be determined that those inessential constituent components are essential because of the fact that those inessential constituent components are depicted and described in the accompanying drawings and the detailed description.

The embodiments are to exemplify the technique of the present invention and various changes, replacements, additions, omissions, and the like can therefore be made to the embodiments within the scope of the appended claims or the scope equivalent thereto.

The disclosed contents of the specification, the drawings, and the claims of Japanese Patent Application No. 2015-256194 filed on Dec. 28, 2015 are incorporated herein in their entireties by reference.

INDUSTRIAL APPLICABILITY

The present invention is applicable to any deformation processing that deforms the shape of a work.

The invention claimed is:

1. A deformation processing support system of a pressing machine that performs a plurality of pressings on a plurality of different positions on an actual work, the deformation processing support system being configured to calculate a necessary deformation amount that is necessary for deforming the actual work from an intermediate shape to a target shape based on a difference between the intermediate shape and the target shape of the actual work via deformation processing of the actual work, the deformation processing support system comprising:
a computer programmed to:
acquire target shape data of the actual work whose surface has a reference line disposed thereon, and calculate a virtual target straight line that connects both ends of the reference line of the target shape data;
acquire intermediate shape data from the actual work having the intermediate shape whose surface has a reference line drawn on the actual work before starting the deformation processing and that changes in shape by the deformation processing, during the deformation processing, and calculate a virtual intermediate straight line that connects both ends of the reference line of the intermediate shape data;
superimpose the target shape data and the intermediate shape data relative to the virtual target straight line and the virtual intermediate straight line by positioning the reference lines relative to each other such that the virtual target straight line and the virtual intermediate straight line do not cross each other;
calculate the necessary deformation amount for each position of the plurality of positions on the actual work based on a difference in the positions between the target shape data and the intermediate shape data; and
control the pressing machine to perform the plurality of pressings in the deformation processing at each position of the plurality of positions on the actual work by the pressing machine based on the calculated necessary deformation amounts for each position of the plurality of positions on the actual work, wherein:
the reference line drawn on the actual work is a scratch line, and
the scratch line changes in shape with a deformation of the actual work that is caused by each pressing performed by the pressing machine.

2. The deformation processing support system according to claim 1, wherein
the reference line includes a first reference line and a second reference line are disposed on each of the surface of the target shape data and the surface of the actual work, and
the computer positions the first reference lines relative to each other and the second reference lines relative to each other, of the target shape data and the intermediate shape data such that: (i) the first reference line on the target shape data and the first reference line on the intermediate shape data partially overlap with each other on an identical plane, and (ii) the second reference line on the target shape data and the second reference line on the intermediate shape data partially overlap with each other on an identical plane.

3. The deformation processing support system according to claim 1, further comprising:
a 3D laser scanner that three-dimensionally measures a shape of the overall work;
a camera that shoots the reference lines on the actual work; wherein:
the computer extracts the reference lines from a shot image of the camera to produces reference line shape data; and
the computer produces the intermediate shape data by combining three-dimensional measurement data of the 3D laser scanner and the reference line shape data with each other.

4. The deformation processing support system according to claim 1, further comprising:
a camera that shoots the actual work having the intermediate shape from plural directions; wherein:
the computer produces intermediate shape data based on data of plural shot images shot by the camera from plural directions.

5. The deformation processing support system according to claim 1, wherein:
the computer produces a contour figure based on the calculated necessary deformation amount for each of the plural positions on the actual work.

6. The deformation processing support system according to claim 1, wherein
plural reference lines are disposed by disposing grid lines on an overall surface of the target shape data and an overall surface of the actual work.

7. A deformation processing support method for use with a pressing machine that performs a plurality of pressings on a plurality of different positions on an actual work, the deformation processing support method calculates a necessary deformation amount necessary for deforming the actual work from an intermediate shape to a target shape based on a difference between the intermediate shape and the target shape of the actual work via deformation processing of the actual work, the deformation processing support method comprising:
acquiring target shape data of the actual work whose surface has a reference line disposed thereon, and calculating a virtual target straight line that connects both ends of the reference line of the target shape data;
drawing a reference line on a surface of the actual work before the deformation processing is started;
acquiring intermediate shape data from the actual work having the intermediate shape whose surface has the reference line drawn on the actual work before starting the deformation processing and that changes in shape by the deformation processing, during the deformation processing, and calculating a virtual intermediate straight line that connects both ends of the reference line of the intermediate shape data;
superimposing the target shape data and the intermediate shape data relative to the virtual target straight line and the virtual intermediate straight line by positioning the reference lines relative to each other such that the virtual target straight line and the virtual intermediate straight line do not cross each other;
calculating the necessary deformation amount for each position of the plurality of positions on the actual work having the intermediate shape based on a difference in the positions between the target shape data and the intermediate shape data; and
controlling the pressing machine to perform the plurality of pressings in the deformation processing at each position of the plurality of positions on the actual work by the pressing machine based on the calculated necessary deformation amounts for each position of the plurality of positions on the actual work, wherein:
the reference line drawn on the actual work is a scratch line, and
the scratch line changes in shape with a deformation of the actual work that is caused by each pressing eperformed by the pressing machine.

8. The deformation processing support method according to claim 7, wherein
the reference line includes a first reference line and a second reference line are disposed on each of a surface of the target shape data and the surface of the actual work, and
positioning of the first reference lines relative to each other and the second reference lines relative to each other of the target shape data and the intermediate shape data is conducted such that: (i) the first reference line on the target shape data and the first reference line on the intermediate shape data partially overlap with each other on an identical plane, and (ii) the second reference line on the target shape data and the second reference line on the intermediate shape data partially overlap with each other on an identical plane.

9. The deformation processing support method according to claim 7, further comprising the steps of:
three-dimensionally measuring, by a 3D laser scanner, the shape of the overall work;
shooting, by a camera, the reference lines on the actual work;
extracting the reference lines from the shot image of the camera to produce reference line shape data; and
producing the intermediate shape data by combining the three-dimensional measurement data of the 3D laser scanner and the reference line shape data with each other.

10. The deformation processing support method according to claim 7, wherein
the intermediate shape data is produced based on data of plural shot images of the actual work having the intermediate shape shot from plural directions by the camera.

11. The deformation processing support method according to claim 7, wherein
a contour figure is produced based on the necessary deformation amount calculated for each of the plural positions on the actual work.

12. The deformation processing support method according to claim 7, wherein
plural reference lines are disposed by disposing grid lines on an overall surface of the target shape data and an overall surface of the actual work.

* * * * *